May 31, 1966 W. S. MILLER 3,254,201

SELECTING APPARATUS

Filed April 2, 1962 3 Sheets-Sheet 1

INVENTOR.
WENDELL S. MILLER

BY William P. Green

ATTORNEY

May 31, 1966

W. S. MILLER 3,254,201

SELECTING APPARATUS

Filed April 2, 1962

3 Sheets-Sheet 2

INVENTOR.
WENDELL S. MILLER
BY William P. Green
ATTORNEY

May 31, 1966 W. S. MILLER 3,254,201

SELECTING APPARATUS

Filed April 2, 1962 3 Sheets-Sheet 3

INVENTOR.
WENDELL S. MILLER
BY William P. Green
ATTORNEY

United States Patent Office 3,254,201
Patented May 31, 1966

3,254,201
SELECTING APPARATUS

Wendell S. Miller, 1341 Comstock Ave.,
Los Angeles, Calif.

Filed Apr. 2, 1962, Ser. No. 184,432
14 Claims. (Cl. 235—61.7)

This invention relates to improved apparatus for responding to indicia formed on an element, such as a card or other sheet of material. While it is to be understood that the apparatus of the invention is broadly applicable to any of numerous different uses, the invention is considered to be especially effective, in certain respects, for use in card scanning apparatus of the type disclosed and claimed in my copending application Serial Number 030,-954, filed May 23, 1960, now Patent No. 3,048,097, on "Card Recording And Scanning Apparatus." The apparatus of that prior application is designed for automatically comparing indicia on a series of credit cards or the like with indicia formed on a reference sheet, for the purpose of giving an indication to the operator when a particular credit card is not in good standing, and should not be honored for further credit.

The primary novelty of the present invention resides in the provision of certain unique light actuated means for responding to indicia formed on a credit card or the like. As will appear, the indicia to be analyzed by the apparatus may take the form of a number of light transmitting or light passing areas (either apertures or reflective areas) formed in a card or other element, and arranged in a particular significant pattern. Light is directed by these areas onto light responsive means, which are connected into a circuit acting to respond in a particular predetermined manner if the light transmitting areas are in a particular pattern. Where the indicia on one element are to be compared with the indicia on another element, the mentioned circuitry may include means adapted to be actuated to any number of different conditions depending upon the arrangement of the indicia on the second element, so that the circuitry acts to compare the indicia on the two elements and respond when the two indicia patterns correspond, or are in a predetermined relation.

The apparatus is designed to provide a predetermined number of different locations at which the apparatus will respond to the transmission of light through a light passing opening or area of a card or the like. At each of these locations, the apparatus includes a light responsive element, so interrelated with the other light responsive means as to produce a desired response to a particular pattern of light transmitting areas. In the optimum arrangement, a series of light responsive areas are formed by a single unitary body of photoconductive material, having different portions responding individually to light transmitted through different areas of the credit card or other element being studied. The photoconductive material may take the form of an elongated strip of such material applied to a base or carrier part formed of glass or the like. To enable response of the single body of photoconductive material to different light patterns, there are provided a series of leads or conductors (more than two such leads or conductors) connected to the photoconductive material at different locations, and insulated from one another for connection separately to the rest of the circuitry of the apparatus. Desirably, these conductors or leads include a series of spaced stripes or localized areas of highly conductive material, such as silver, coated on the single piece of photoconductive material at spaced locations, and appropriately connected to the rest of the circuit. Where the photoconductive material is in the form of an elongated strip, the conductor bands may extend transversely across this strip at spaced locations, and may be positioned in the light path to produce opaque areas at which light can not affect the underlying photoconductive material.

In one form of the invention, a single light responsive assembly may be designed to respond to light passing through or reflected by each of two different elements being compared. For example, light may be directed through apertures in a credit card and onto one side of a light responsive unit, and at the same time light may be directed through apertures in another element onto another side of the light responsive unit, so that if the patterns of the two light responsive areas are similar, the light responsive unit will become conductive or will otherwise respond in a predetermined manner. In such an arrangement, the light responsive unit may be a strip of photoconductive material having localized conductive coatings at each of two sides interconnected to attain the discussed result.

It is contemplated that, if desired, a light responsive unit embodying the invention may be provided for responding to the light passing areas in one of two elements to be compared, while some other type of multiple switching assembly may be employed for responding to the light passing areas of the second element. However, the greatest advantages are attained from the invention if both of the switching units are of the light responsive type.

A further object of the invention relates to an improved overall switching arrangement for rendering a device embodying the invention responsive, in extremely simple but effective manner, to a full binary type of coding system.

The above and other features and objects of the present invention will be better understood from the following detailed description of the typical embodiments illustrated in the accompanying drawings, in which.

Figure 1:
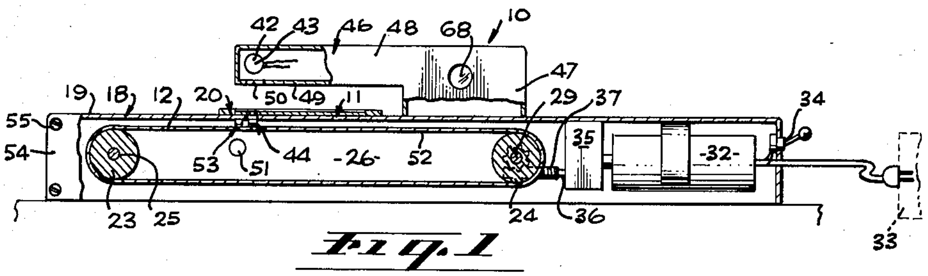
FIG. 1 is a partially elevational and partially sectional view of a scanning device embodying the invention.
Figure 2:
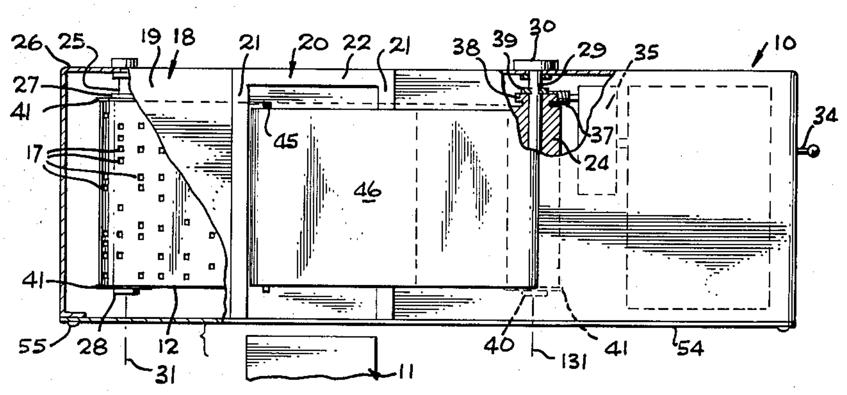
FIG. 2 is a plane view of the FIG. 1 device.

The device 10 illustrated in FIGS. 1 and 2 is adapted for use in comparing a pattern of apertures on a credit card or other card 11 with a series of aperture patterns formed on a reference belt 12. For example, the card 11 may typically be one of a large number of such cards held by different individuals, and issued by a particular oil company to indicate that the various individuals are entitled to receive credit from that company. Each of the cards may have raised letters, numbers, or other markings 13 formed on its face, and adapted to be used in printing the name, license number, and other information regarding the purchaser on a sales slip at the time of each purchase. The device 10 may include conventional means for effecting this printing operation, but for simplicity of illustration no attempt has been made to illustrate such printing mechanism in the drawings.

In addition to the usual raised letters, etc., card 11 has, in accordance with the present invention, a series of light passing apertures 14 formed through the card at predetermined locations thereon. Each card has its apertures 14 arranged in a different pattern, which pattern is used to designate the holder of that particular card. The apertures 14 may be aligned in a straight line, parallel to and typically near one of the edges 15 of the rectangular card. It may be assumed that, for all of the cards, there are a certain predetermined number of possible locations for the apertures on the cards, these possible locations typically being spaced uniformly along the straight line path of the apertures, but with each of the individual cards having apertures at only some and not all of the possible positions. For example, in the card represented in FIG. 4, one or more possible apertures are omitted at each of the locations designated 16.

The element 12 is an endless belt or band which contains a large number of groups 17 of apertures extending transversely across the length of belt 12. At the location of each transverse row of apertures, there are the same number of possible aperture locations as are present on each of the cards 11, but as in the case of the cards, only some and not all of the apertures are actually present, with the result that each of the rows or groups 17 of apertures has a characteristic aperture pattern which corresponds to one and only one of the cards 11 which are outstanding. The various aperture patterns present on belt 12 may be those representing all of the cards which are for some reason not in good standing, and which should either be picked up by a station attendant or at least not honored. Belt 12 may be formed of any suitable flexible sheet material, such as vinyl plastic film, paper, or the like. As will be brought out at a later point, the apparatus is designed to allow easy removal and replacement of belt 12, so that new belts of this type may be supplied to all of the different stations or outlets by the main office of the company involved, carrying up-to-date aperture patterns representing the latest groups of cards which should not be honored.

The device 10 may have a rectangular housing 18, typically formed of sheet metal or the like, and having an upper horizontal wall 19 on which one of the cards 11 may be placed during a scanning operation. For locating the card 11 on top wall 19 of the housing, there may be formed on the upper surface of this wall a bead or strip of material 20, having two parallel portions 21 interconnected by an end piece 22, to form a rectangular recess adapted to exactly receive and accurately locate card 11 on wall 19. When the card is thus positioned within the locating frame 20, the apertures 14 on the card are at a predetermined proper location for coaction with the later-to-be-discussed light responsive portion of the apparatus.

Belt 12 is mounted for endless movement within housing 18 by means of two parallel horizontally spaced rollers 23 and 24. Roller 23 is an idler, mounted to turn freely about a shaft 25 rigidly attached to and projecting horizontally from a side wall 26 of the housing. Roller 23 may be suitably retained against axial movement along shaft 25, as by the provision of suitable retaining rings, enlargements, or thrust bearings represented at 27 and 28.

The second roller 24 is similarly mounted for rotation about a second shaft 29, disposed parallel to shaft 25, and also rigidly secured at one end 30 to vertical wall 26 of the housing. Roller 24 is rotatably driven about its horizontal axis 31 by an electric motor 32, which is energized and deenergized, from a power source 33, in accordance with the operation of a typically manually operated switch 34 connected in series with the motor. The motor may act at drive a governor 35, whose output shaft 36 turns at a predetermined uniform rate of speed, with this shaft carrying a worm 37, engaging a wormgear 38 which may be integral with or rigidly connected to roller 24, to turn the roller in accordance with the governor controlled operation of the motor. The wormgear 38 and its roller 24 may be retained against axial movement in either direction, relative to mounting shaft 29, as by the provision of rings or thrust bearings 39 and 40 on the shaft. The spacing of rollers 23 and 24 is such that belt 12 is fairly tight on these rollers, and is effectively frictionally held thereon, and driven by the rollers. However, provision is also made for removal of the belt when desired, as by forming the belt of a slightly elastic or stretchable resinous plastic material, or with an elastic section, or by providing the belt at one point with two ends which may be disconnected from one another to completely release the belt from the rollers. If desired, the rollers 23 and 24 may have small side flanges at 41 for laterally retaining the belt against movement axially of the rollers in operation.

At a location above the point at which card apertures 14 are received, when a particular card 11 is in the FIG. 1 position on housing 18, I provide an electrically energized light bulb 42, which is elongated along an axis 43 extending parallel to axes 31 and 131 of rollers 23 and 24. Axis 43 of the light bulb is also parallel to the row of apertures 14 on card 11. The bulb directs light downwardly along the entire row of apertures 14, and through these apertures to impinge upon predetermined portions of a light responsive photoconductive unit 44. Unit 44 may be mounted to the underside of top wall 19 of the housing, with an elongated slot 45 being formed in wall 19, this slot being elongated parallel to axis 43 of the bulb, and being of a length in that direction great enough to permit light from the bulb to pass downwardly through all of the apertures 14 in any of the cards and through slot 45 onto unit 44.

Bulb 42 may be suitably mounted within an upper housing 46, having a portion 47 suitably rigidly connected to top wall 19 of the main portion of the housing, and projecting horizontally over the card receiving portion of wall 19 at 48, in spaced relation to top wall 19, to properly locate the light bulb. The bottom wall 49 of portion 48 of the upper housing contains an elongated slot 50, extending in the same direction as do light bulb 42, the row of apertures 14, slot 45 and unit 44, and long enough to pass light downwardly from bulb 42 through any of the apertures 14 which may be present on a particular card and then downwardly through slot 45 to unit 44.

For coacting with belt 12, a second light bulb 51 may be provided within housing 18, at the underside of the upper run 52 of the belt, bulb 51 being elongated parallel to bulb 42, and parallel to the rows 17 of apertures on belt 12, and being adapted to (and long enough to) pass light upwardly through all of the apertures which may be present in any particular row 17 on the belt, and onto corresponding localized areas of a second light responsive unit 53 mounted to the underside of top wall 19. If preferred, a single light bulb may be substituted for the two bulbs 42 and 51, with appropriate mirrors or light conducting means being included in the apparatus for directing light from this single bulb along two paths to pass through both the card and belt and onto light responsive units 44 and 53. It is also noted that the lower or main housing 18 of the device may have a removable side wall 54, secured to a side of the housing by screws or other means represented at 55, and removable to permit access to bulb 51 and belt 12 for removal and replacement.

To now describe the light responsive unit 44 of the apparatus, this unit may include an elongated strip of glass or other suitable base material 56, whose length dimension is parallel to slot 45, the row of apertures 14 of card 11 in FIG. 1, and bulb 42. The strip of glass 56 may have the rectangular cross-sectional configuration illustrated in FIG. 3. On the upper surface of glass strip 53, there is deposited a coating or layer 57 of photoconductive material, extending continuously along the entire length and width of glass 56. This photoconductive material is one which is normally not capable of conducting electricity, but which becomes highly conductive when illuminated. As typical examples, the photoconductive material 57 may be cadmium sulfide or lead sulfide. At a series of locations spaced evenly along the length of coating 57, there are formed on the upper surface of this coating a number of conductive strips 58, which are in electrical contact with coating 57, and which are not dependent upon illumination for their capacity to conduct electricity. Preferably, strips 58 are deposited on the upper surface of coating 57 as thin localized layers of silver, bonded tightly to layer 57. Silver strips 58 are positioned between the various successive possible locations at which apertures 14 of the cards 11 may be located, so that light passing through any of these apertures will fall on a local area such as that designated 59 in FIG. 5, and will illuminate a portion of the photoconductive material extending all of the way between two successive silver strips 58, to thereby form an electrically conductive path between these two strips. Strips 58 are elongated transversely of the length dimension of photoconductive strip 57. The two end ones of the conductor strips 58 may be connected to power supply or energizing leads 60 and 61 while the intermediate strips 58 are connected separately to individual leads 62. To facilitate such connection of silver strips 58 to leads 62, each of the strips 58 may have a portion 63 extending downwardly along one side of the coating 57 and glass strip 56, for suitable connection to the corresponding one of the leads 62. For holding the entire unit 44 in place, there may be provided an opaque housing or casing 164, suitably secured to the underside of wall 19 by flanges 165, and extending about the entire underside of unit 44 to prevent the admission of light from bulb 51 onto this unit. The element 164 and top wall 19 of the housing may be of an electrically non-conductive material, such as a suitable resinous plastic material, to prevent electrical shorting of unit 44 by these parts; or if it is desired that top wall 19 be formed of metal, provision may be made for appropriately insulating this top wall from the conductors 57 and 58.

The second light responsive unit 53, for responding to light passed upwardly from bulb 51 through the apertures in belt 12, may be considered as constructed essentially the same as unit 44, but inverted for response to upwardly directed light rather than downwardly directed light. More particularly, unit 53 includes an elongated strip or piece of glass 64, extending parallel to unit 44, bulbs 42 and 51, and the rows of apertures on the card 11 and belt 12. To the underside of glass 64, there is applied a coating of photoconductive material, such as cadmium sulfide or lead sulfide, extending continuously across the entire underside of part 64, and bonded continuously thereto. A series of uniformly spaced transverse strips of silver are bonded to or deposited on the under surface of photoconductive material 65, at locations spaced in correspondence with the spacing of silver strips 58 of unit 44. The two end conductors 66 of unit 53 (see FIG. 5) are connected to the end ones of the conductors 58 of unit 44, while the intermediate elements 66 are connected to corresponding ones of the conductors 58 through leads 62. The entire unit 53, including parts 64, 65 and 66, is secured to the underside of wall 19 by means of electrically insulative brackets 67, or any other convenient means.

Figures 5, 6, 8, 11:
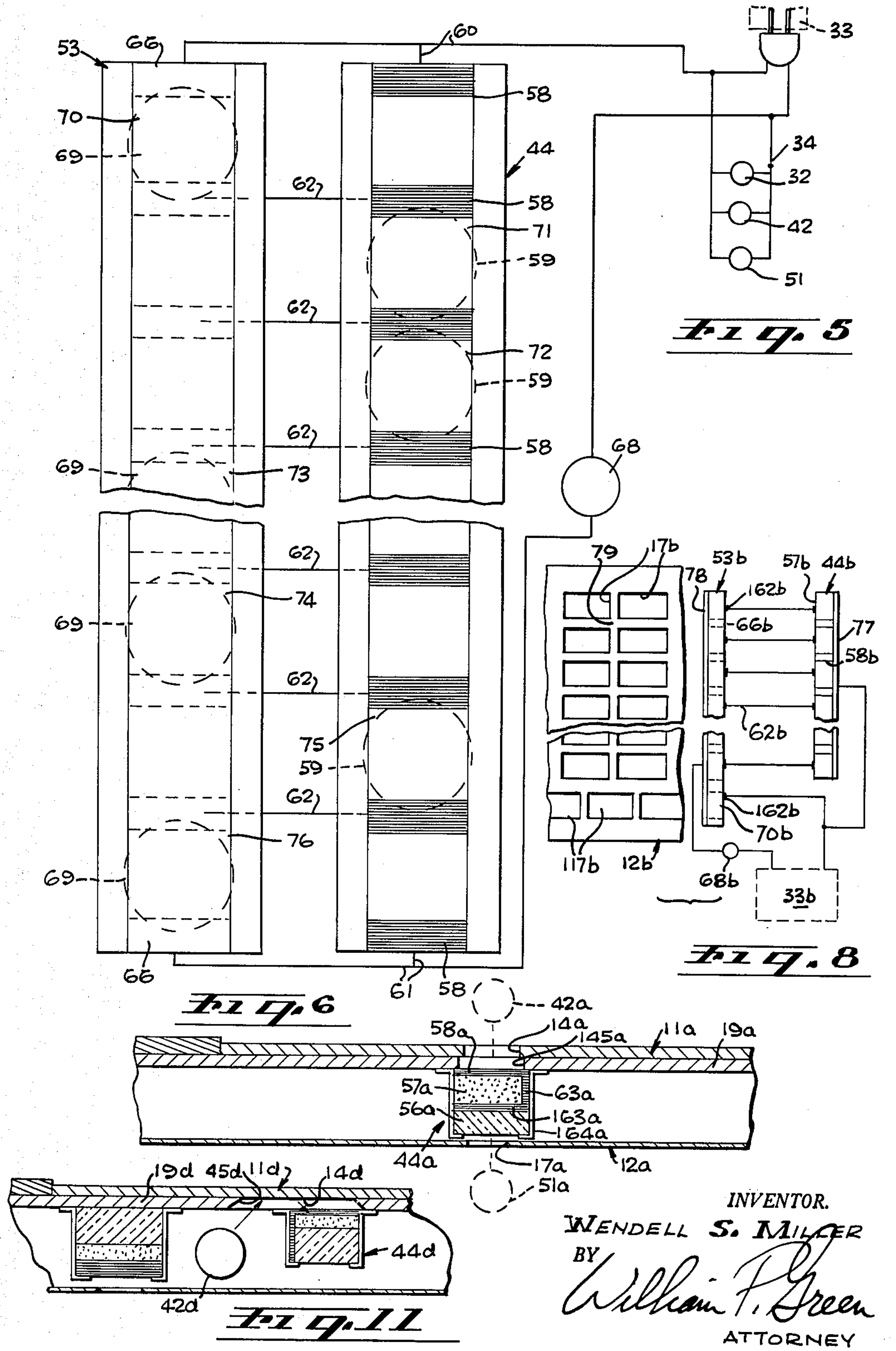
FIG. 5 is an electrical circuit diagram of the device.
FIG. 6 shows in section a second form of device.
FIG. 8 is a view showing another electrical circuit.
FIG. 11 represents another form of the invention.

As will be apparent from the circuit diagram of FIG. 5, the electric power source 33 is connected to leads 60 and 61, in series with an indicator bulb 68. The two illuminating bulbs 42 and 51 may be connected to the power source in parallel with motor 32, so that actuation of switch 34 to closed position acts to energize motor 32 to continuously drive belt 12, and also energizes light bulbs 42 and 51.

When it is desired to compare the apertures 14 on a particular card 11 and with all of the sets of apertures 17 on belt 12, the operator merely places the card 11 in the FIG. 1 position of reception on the housing, and turns switch 34 on. This commences the continuous advancement of belt 12 along its endless path, so that the various groups 17 of apertures on the belt successively pass between bulb 51 and photoconductive unit 53. The unit 53 acts to successively scan the different aperture patterns on belt 12, and compare those aperture patterns individually with the pattern to which unit 44 is subjected by card 11. If the aperture and opaque areas in one of the rows 17 on the tape 12 happen to be exactly the opposite of the apertured and opaque areas on card 11, then that particular set of apertures on the belt is intended to represent the same card as the one which is presently in the apparatus, and the device responds to this condition by illuminating indicator light 68. Thus, the operator is appraised of the fact that this particular card 11 should not be honored. The various patterns of apertures on the different cards, and in the different sets of apertures on belt 12, may be so coded that all cards have exactly "$t$" possible aperture locations, of which exactly "$n$" locations are occupied by apertures, while on the belt each series of apertures have the same number "$t$" of possible aperture locations, and "$t-n$" apertures, (with $n$ preferably being equal to approximately ½ of $t$ for greatest information carrying capacity), so that unless the apertures on the belt coincide exactly with the unapertured areas on a card being compared, the indicator light 68 can not possibly be energized.

To discuss in greater detail the manner in which the circuit responds to the subjection of units 44 and 53 to light patterns representing the same card, assume that the card 11 has apertures so located as to pass light through these apertures and onto the photoconductive substance 57 of unit 44 at the locations represented in broken lines at 59 in FIG. 5. Also assume that one of the sets 17 of apertures on belt 12 has apertured areas at locations acting to pass light onto photoconductive material 65 at the locations designated in broken lines at 69 in FIG. 5. With the various light patterns in this arrangement, electrical energy may flow from lead 60 in FIG. 5 through a first photoconductive area 70 of unit 53, since that area is illuminated. After passing through area 70, the current may flow through a first one of the transverse conductors 62 to the other photoconductive unit 44, to then pass through the second and third photoconductive area 71 and 72 of unit 44. The current then returns to unit 53 to pass through illuminated conductive areas 73 and 74, then back through area 75 of unit 44, and finally through illuminated photoconductive area 76 of unit 53 to lead 61. Thus, a circuit is completed through the various complementary illuminated areas of the two units 44 and 53, to pass current through indicator light 68, and thereby appraise the operator that the card in question should not be honored. As will be apparent, if the apertures on belt 12 did not correspond reversely to the apertures on card 11, the discussed circuit would be broken at some point, and indicator light 68 would not be energized.

Figure 7:
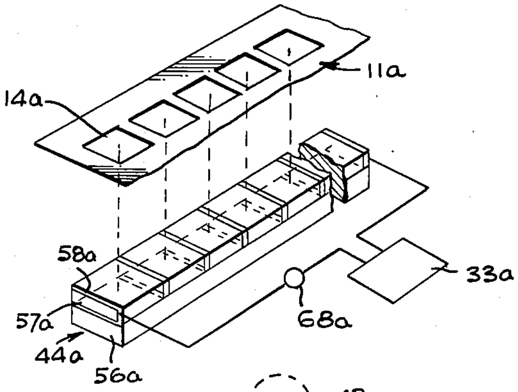
FIG. 7 is a perspective fragmentary representation of the light responsive unit of FIG. 6.

FIGS. 6 and 7 illustrate a variational form of the invention, which is basically very similar to that of FIGS. 1 to 5, except that a single photoconductive unit **44*a* performs the functions of both of the photoconductive units 44 and 53 in the first form of the invention. Unit 44*a* consists of an elongated strip of fully transparent clear glass 56*a*, extending transversely of belt 12*a*, and mounted at the underside of wall 19*a* of the housing. On the upper side of glass strip 56*a*, there is deposited a layer of photoconductive material, typically cadmium sulfide or lead sulfide, extending continuously along the entire length of glass strip 56*a*. At a plurality of locations spaced along the length of the photoconductive material 57*a*, there are provided a series of spaced transverse parallel conductive areas 58*a*, which may be formed of silver or other highly conductive material, and are positioned in correspondence with conductive areas 58 of FIGS. 3 and 5. The film of silver or other conductive material at each of the locations 58*a* continues downwardly along the side of the photoconductive material 57*a* (as represented at 63*a* in FIGS. 6 and 7), and then continues inwardly at the under side of the photoconductive material to form conductive strips 163*a* directly beneath and dimensioned in correspondence with top conductor strips 58*a*. Thus, there is formed between each of the conductors 58***a*, 63*a*, 163*a* and the next successive conductor 58*a*, 63*a*, 163*a* a photoconductive area of the material 57*a* which is accessible to light from either above or beneath unit 44*a*.

Light from an upper bulb 42*a* (corresponding to bulb 42 of FIG. 1) is passed downwardly through the apertures 14*a* of a card 11*a* which is being scanned, and through slot 45*a* in wall 19*a*, to locally affect photoconductive material 57*a* wherever card 11*a* is apertured. Similarly, light from a bottom bulb 51*a* (corresponding to bulb 51 in FIG. 1) passes upwardly through the apertures 17*a* in endless belt 12*a*, to affect photoconductive material 57*a* locally wherever the belt is apertured. Unit 44*a* may be secured to the underside of housing wall 19*a* by brackets of the type represented at 164*a*, appropriately secured to wall 19*a*, with brackets 44*a* and wall 19*a* preferably being formed of insulative material to prevent shorting of unit 44*a* thereby. It will of course be apparent that the longitudinal axis of unit 44*a* extends parallel to bulbs 42*a* and 51*a*, and parallel to the apertures of the card and belt.

In using the apparatus of FIGS. 6 and 7, the power source 33*a* is connected through indicator bulb 68*a* to the opposite end ones of the conductor strips 58*a* of unit 44*a*. If the apertures in top card 11*a* then exactly complement the apertures in any one of the groups of apertures in belt 12*a*, then the series of photoconductive sections of unit 44*a* will all become conductive, and complete the circuit of indicator bulb 68*a*. At the location of each aperture in card 11*a*, light passes downwardly through that aperture across a large enough area to illuminate a portion of the photoconductive material 57*a* from one of the transverse conductors 58*a* to the next such conductor. Similarly, light passing upwardly through any of the apertures in tape 12*a*, and through transparent glass 56*a*, forms an illuminated photoconductive bridge between two successive conductors 163*a*, so that a complete series circuit through unit 44*a* is formed whenever each of the photoconductive areas between successive silver conductors is illuminated either from the top or the bottom. In this form of the invention, and in the first form, the sliver conductors 58*a*, 163*a*, 58, and 66 form opaque areas, which block off the transmission of light to the photoconductive material at the locations of these conductors.

FIG. 8 shows a circuit diagram of another form of the invention, which may be considered as identical with that of FIGS. 1 through 5 except as to the construction of photoconductive units 44*b* and 53*b* (corresponding to units 44 and 53 of FIG. 1), and the manner of electrical connection of these units. The unit 44*b* may be formed of a strip of glass having a photoconductive layer 57*a* extending along its entire length, with the photoconductive layer having a silver or other highly conductive strip 77 extending along one of its sides. At the locations of the transverse conductors 58 of FIG. 5, the unit 44*b* of FIG. 8 may have, instead of such conductors, a series of uniformly spaced transverse opaque nonconductive areas or stripes 58*b*, typically formed of suitable black paint.

As in FIG. 5, light from the upper bulb 42 of FIG. 1 is directed downwardly on unit 44*b* of FIG. 8, against the face of the unit which is visible in FIG. 8, while light from the second bulb 51 is directed upwardly against the underside of unit 53*b*, against the surface which is facing away from the viewer in FIG. 8. Unit 53*b* may include a strip of glass corresponding to element 64 of FIG. 3, having a photoconductive coating at its underside (corresponding to coating 65 of FIG. 3), with that coating being connected along the entire length of one of its sides to a conductor 78. Opaque nonconductive transverse stripes 66*b* extend across the underside of the photoconductive material of unit 53*b* at the locations of transverse conductors 66 in FIG. 5. The various individual photoconductive areas of unit 53*b*, separated by stripes 66*b*, are electrically connected to the corresponding areas of the photoconductive material of unit 44*b*, by transverse leads 62*b*, whose opposite ends may be secured to small silvered areas 162*b* deposited on the adjacent surfaces of the photoconductive materials (the sides of those materials away from conductor strips 77 and 78). The two strips 77 and 78 are connected to a power source 33*b* in series with an indicator lamp 68*b*.

In FIG. 8, the belt to be scanned is represented at 12*b*, with the rows of apertures corresponding to those shown at 17 in FIG. 2 being represented at 17*b* in FIG. 8. In addition to these apertures (and unapertured areas at some of the possible aperture locations), there are provided in the FIG. 8 belt 12*b*, a row of additional apertures 117*b* which are receivable between the bottom light (51 of FIG. 1) and an extra end one of the photoconductive areas 70*b* of unit 53*b*. The second unit 44*b* does not have an end area corresponding to area 70*b*, so that instead of having the conductor 162*b* of end area 70*b* of unit 53*b* connected to unit 44*b*, this conductor 162*b* is connected directly to power source 33*b*, with the result that a circuit to indicator light 68*b* is closed whenever end area 70*b* is illuminated, regardless of what may be the condition of the other areas of units 43*b* and 53*b*.

When the device of FIG. 8 is in use, indicator bulb 68*b* is energized at all times except when the apertured and unapertured areas in a particular row 17*b* on the belt are located exactly the opposite of the apertured and unapertured areas of the card positioned above unit 44*b*. When such a row of apertures on the belt is received just beneath unit 53*b*, the circuit to indicator light is momentarily broken, so that the light turns off, and indicates to an operator that the card should not be honored. If desired, a latching relay may be inserted into the circuit, for maintaining the bulb 68*b* in deenergized condition, until the relay is reset, after such momentary opening of the indicator circuit.

To describe more specifically the manner in which the circuit to indicator light 68*b* is maintained closed except when one of the rows of apertures 17*b* represents the card being studied, it is noted that so long as any one of the apertures on the card is positioned in correspondence with any one of the apertures on one of the rows 17*b* of the belt, then the circuit to indicator light 68*b* will be closed through units 44*b* and 53*b* when that particular row 17*b* is in position beneath unit 53*b*. If two such corresponding apertures are present, two opposed areas of units 44*b* and 53*b* connected by a conductor 62*b* will be simultaneously illuminated, to complete a circuit to bulb 68*b* through these two photoconductive areas and the connecting line 62*b*.

Between successive rows of belt apertures 17*b*, there are narrow opaque areas 79 of the belt. The purpose of the additional row of apertures 117*b* is to maintain the circuit closed to indicator light 68*b* when these opaque areas 79 of the belt pass beneath unit 53*b* and therefore render all but the end area 70*b* nonconductive. As will be apparent from FIG. 8, the apertures 117*b* are received opposite opaque areas 79, and longitudinally overlap the apertures of two successive rows 17*b*, in a relation acting to illuminate area 70*b* and thereby maintain the circuit to light 68*b* closed through area 70*b* during the transition periods when opaque areas 79 are passing unit 53*b*. The apertures 117*b* continue in the manner illustrated in FIG. 8 along the entire endless extent of belt 12*b*, so that the only instance in which the energization to light 68*b* can be interrupted occurs when the apertured areas in one of the rows 17*b* correspond reversely to the apertured areas in the card being analyzed, as discussed above.

Figure 3:
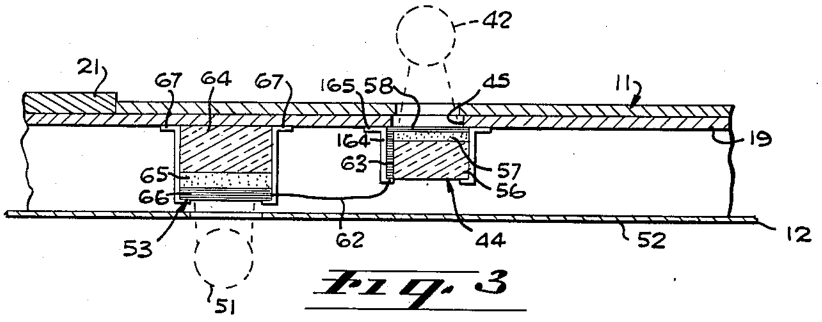
FIG. 3 is an enlarged fragmentary vertical section through the light responsive units of the FIG. 1 device.
Figure 9:
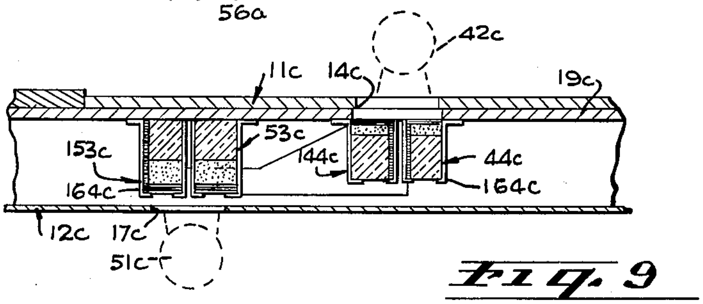
FIG. 9 is a view similar to FIG. 3 of another form of the invention.
Figure 10:
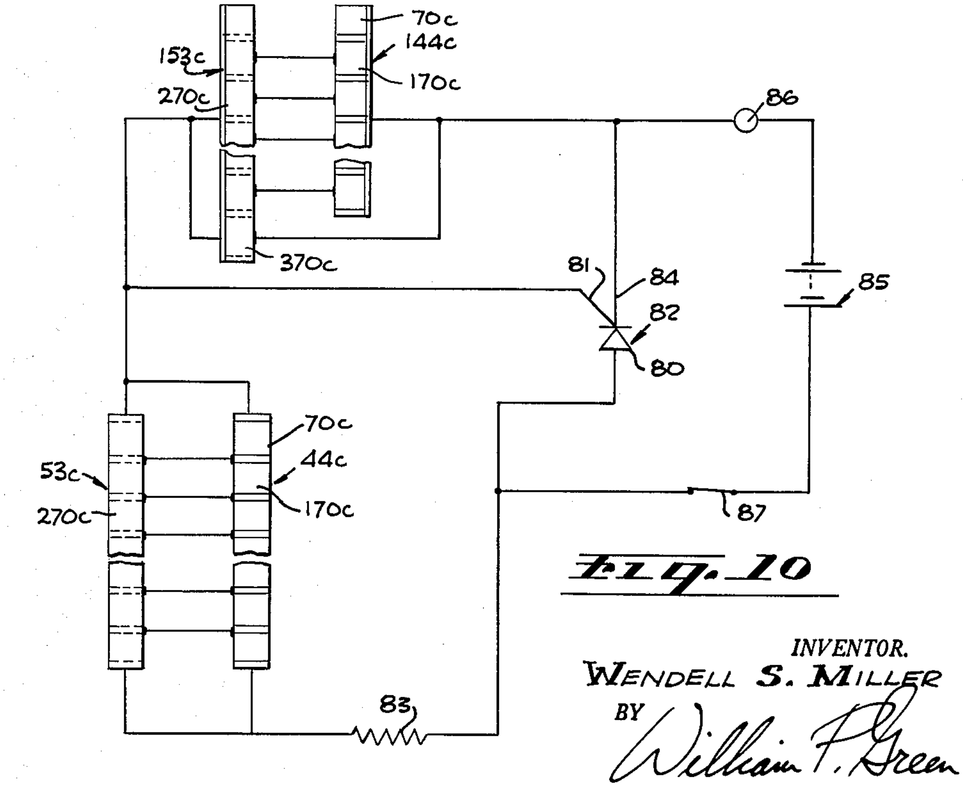
FIG. 10 is the circuit of the FIG. 9 device.

FIGS. 9 and 10 are views corresponding to FIGS. 3 and 5 respectively but representing another form of the invention, which is particularly adapted for use in conjunction with a coding system of the true binary type. This FIGS. 9 and 10 arrangement may in certain respects be considered as a combination of the circuit of FIG. 8 with the circuit of FIG. 5, to attain the desired true binary response.

As seen in FIG. 9, there are provided, for simultaneous response to light passing through apertures 14*c* in card 11*c* two light responsive units 44*c* and 144*c*. Unit 44*c* may be identical with light responsive unit 44 of FIG. 3, except that it has been reduced in width to occupy only one-half of the width of apertures 14*c*. Similarly, the light responsive unit 144*c* may be identical with that designated 44*b* in FIG. 8, except for a corresponding reduction in width. Similarly, there are provided, for simultaneous response to light passing through apertures 17*c* of belt 12*c*, two units 53*c* and 153*c* which may be identical with unit 53 of FIG. 3 and unit 53*b* of FIG. 8, respectively, except for an appropriate reduction in width to allow the desired simultaneous response of the two units 53*c* and 153*c* to light passing through apertures 17*c*. The elongated housings or brackets 164*c* of the different light responsive units, as well as top wall 19*c* of the main housing of the device, may be of electrically insulative material, to avoid shorting any of the light responsive elements.

With reference now to FIG. 10, it is noted that the two units 144*c* and 153*c* are connected together in the same manner as are units 44*b* and 53*b* in FIG. 8. The two units 44*c* and 53*c* are connected together in exactly the same manner as are units 44 and 53 of FIG. 5.

The entire light responsive switch assembly formed by the two units 44*c* and 53*c* is connected between the anode 80 and control grid 81 of a silicon controlled rectifier 82, in series with a resistor represented at 83. The second switching assembly 144*c*–153*c* is connected between the cathode 84 and control grid of the rectifier. The silicon controlled rectifier is energized by a battery 85, connected in a series circuit with an indicator bulb 86 and a normally closed reset switch 87, this series circuit extending between the anode and the cathode of the rectifier.

The light responsive unit 44*c*, 53*c*, 144*c* and 153*c* are so constructed that their individual light responsive areas are all of the same length longitudinally of these different units, and with corresponding areas of the units 44*c* and 144*c* (and similarly corresponding light responsive areas of the units 53*c* and 153*c*) being positioned opposite one another for response to light passing through the same aperture. That is, the units are so constructed that, if an aperture is present in card 11*c* at a first location, then light will pass from light source 42*c* through that first aperture (14*c* in FIG. 9), and will fall on corresponding first light responsive areas 70*c* of units 44*c* and 144*c*. Similarly, if a second aperture is present on the card, then light will pass through that second aperture and simultaneously fall on and close a circuit through corresponding second areas 170*c* on the two units 44*c* and 144*c*, etc. If any particular aperture 17*c* is present in belt 12*c*, then light from bottom source 51*c* will pass through that aperture and simultaneously fall on and close a circuit through two corresponding light responsive areas of units 53*c* and 153*c*, for example, the two areas designated 270*c* in FIG. 10.

In using the device of FIGS. 9 and 10, the switch assembly 44*c*–53*c* functions in exactly the manner discussed hereinabove in connection with the FIG. 5 arrangement, to close a circuit through this switch assembly whenever the apertures in card 11*c* and in one of the rows of apertures of belt 12*c* are so related that there is an aperture present on either the card or belt (or both) at each of the various different possible aperture locations. The other switch assembly 144*c*–153*c* responds in the manner of the similar arrangement of FIG. 8 to maintain the circuit through this switch assembly closed except when the two compared sets of apertures on the card and belt do not contain any one pair of correspondingly positioned apertures. While the belt is moving between two successive reading locations, the circuit is kept closed by illumination of an end area 370*c* of unit 153*c* by light passing through belt apertures such as those shown at 117*b* in FIG. 8.

If the switch 44*c*–53*c* becomes conductive during comparison of the card apertures with a row of apertures on the belt, and the other switch 144*c*–153*c* becomes non-conductive at the same time, the circuit of FIG. 10 responds by energizing light bulb 86, to indicate that the card apertures are exactly the opposite of the belt apertures. This is true because the conductivity of switch 44*c*–53*c* indicates that each possible aperture location (digit) has an aperture on either the card or belt, while the non-conductivity of the other switch 144*c*–153*c* proves that no location is apertured (no digit is represented) on both cards.

The illustrated silicon controlled rectifier circuit is typically shown as one overall circuit which may respond in the discussed manner to the two switch assemblies. In this circuit, the silicon controlled rectifier is normally non-conductive, but is rendered conductive when switch 44*c*–53*c is closed, and switch 144***c*–153*c* is opened, since this arrangement connects the control grid to the anode and not the cathode of the rectifier. If switch 44*c*–53*c* is not closed, then this connection between the anode and control grid is not completed, and the rectifier is therefore not conductive. Further, even though the switch 44*c*–53*c* is closed, the rectifier is not conductive if the second switch 144*c*–153*c* is also closed, since this connects the control grid directly to the cathode, and to the anode only through resistor 83. Once the silicon controlled rectifier has become conductive, it remains conductive regardless of the condition of the photoconductive switches, to continue to illuminate bulb 86 and thereby apprise the operator of the correspondence between the card and belt apertures. The device may be reset by opening of normally closed switch 87, to again render the silicon controlled rectifier non-conductive, and return the apparatus to its original condition.

Figure 4:
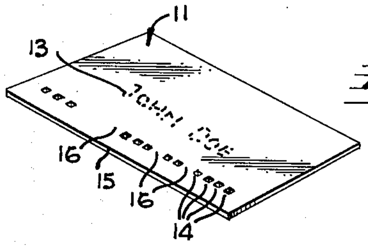
FIG. 4 is a perspective of a card for use in the device.

FIG. 11 represents fragmentarily another form of the invention, which is the same as that of FIGS. 1 through 5 except as to the structure of card 11*d* and the manner in which unit 44*d* (corresponding to unit 44 of FIG. 3) is illuminated. In FIG. 11, the card 11*d* does not contain apertures 14 as shown in FIG. 4, but instead is provided with a pattern of locally aluminized light reflective areas 14*d* at its underside, and a series of dark non-reflective areas therebetween. At each of the various locations at which reflective areas 14*d* may occur, top wall 19*d* of the housing contains an aperture 45*d*, shaped as shown, and adapted to pass light upwardly from an elongated bulb 42*d* against the corresponding reflective area to then be reflected by that area downwardly onto the corresponding light responsive area of unit 44*d*. The dark areas of course do not reflect light as shown, and consequently unit 44*d* is illuminated in a pattern dependent upon the pattern in which reflective areas 14*d* fall on a particular card 11*d*.

It will of course be understood that, in any of the various forms of the invention, reflective areas as shown in FIG. 11 may if desired be substituted for the light passing apertures of either the card or belt. Also, in the claims, when the phrase "light transmitting area" or the phrase "light passing area" is employed, each of these phrases is to be understood as including broadly both the light passing aperture type of arrangement discussed in conjunction with most of the illustrated forms of the invention, and the light reflective areas of FIG. 11.

I claim:

1. Apparatus for comparing a first element having a plurality of light passing areas arranged in a significant pattern with a second element having a plurality of light passing areas also arranged in a significant pattern, said apparatus including light responsive means defining a plurality of light responsive areas positioned in correspondence with a predetermined number of possible positions for said light passing areas of said two elements, means for passing light through said light passing areas of both of said elements and onto said plurality of light responsive areas respectively, said last mentioned means being constructed to pass light essentially simultaneously through said light passing areas of both of said elements and onto the same one of said light responsive areas in instances in which the two elements have correspondingly positioned light passing areas, and electrical circuitry connected to said light responsive means and responsive to the light actuation thereof.

2. Apparatus for comparing a first element having a plurality of light passing areas arranged in a significant pattern with a second element having a plurality of light passing areas also arranged in a significant pattern, said apparatus including light responsive means defining a plurality of light responsive areas positioned in correspondence with a predetermined number of possible positions for said light passing areas of said two elements, means for passing light through said light passing areas of said first mentioned element and onto corresponding ones of said light responsive areas, means for passing light separately, along a different path, through said light passing areas of said second element and onto corresponding ones of said light responsive areas, said two last mentioned means bieng constructed to pass light essentially simultaneously through said light passing areas of both of said elements and onto the same one of said light responsive areas in instances in which the two elements have correspondingly positioned light passing areas, and electrical circuitry connected to said light responsive means to the light actuation thereof.

3. Apparatus for comparing a first element having a plurality of light passing areas arranged in a significant pattern with a second element having a plurality of light passing areas also arranged in a significant pattern, said apparatus including light responsive means defining a plurality of light responsive areas positioned in correspondence with a predetermined number of possible positions for said light passing areas of said two elements, means for passing light through said light passing areas of said first mentioned element and onto corresponding ones of said light responsive areas, means for passing light separately, along a different path, through said light passing areas of said second element and onto corresponding ones of said light responsive areas, said two last mentioned means being constructed to pass light essentially simultaneously through said light passing areas of both of said elements and onto the same one of said light responsive areas in instances in which the two elements have correspondingly positioned light passing areas, and electrical circuitry connected to said light responsive means and responsive to the light actuation thereof, said circuitry including means forming an electrical series circuit through said light passing areas and responsive to light actuation of all of said areas to pass current through said series circuit.

4. Apparatus for comparing a first element having a plurality of light passing areas arranged in a significant pattern with a second element having a plurality of light passing areas also arranged in a significant pattern, said apparatus including a body of photoconductive material having a series of photoconductive areas arranged in sequence therealong, means for holding said two elements at two different sides of said body of photoconductive material, means for passing light from one of said sides through said light passing areas of the first of said elements and onto corresponding ones of said photoconductive areas, means for passing light from the other of said sides through said light passing areas of the second element and onto corresponding ones of said photoconductive areas, said two last mentioned means being constructed to pass light essentially simultaneously through said light passing areas of both of said elements and onto the same one of said photoconductive areas in instances in which the two elements have correspondingly positioned light passing areas, and electrical circuitry connected to said photoconductive body and responsive to the light actuation thereof.

5. Apparatus as recited in claim 4, in which one of said elements is a card containing a plurality of said light passing areas, the other of said elements being an endless belt containing a series of groups of the light passing areas movable successively past said photoconductive body to successively scan said different groups.

6. Apparatus for comparing a first element having a plurality of light passing areas arranged in a significant pattern with a second element having a plurality of light passing areas also arranged in a significant pattern, said apparatus including a body of photoconductive material having series of photoconductive areas arranged in sequence therealong, means for holding said two elements at two different sides of said body of photoconductive material, means for passing light from one of said sides through said light passing areas of the first of said elements and onto corresponding ones of said photoconductive areas, means for passing light from the other of said sides through said light passing areas of the second element and onto corresponding ones of said photoconductive areas, said two last mentioned means being constructed to pass light essentially simultaneously through said light passing areas of both of said elements and onto the same one of said photoconductive areas in instances in which the two elements have correspondingly positioned light passing areas, and electrical circuitry connected to said photoconductive body and responsive to the light actuation thereof, said circuitry including means forming an electrical series circuit through said photoconductive areas and responsive to light actuation of all of said areas to pass current through said series circuit.

7. Apparatus for comparing a first element having a group of indicia arranged in a predetermined significant pattern with a second element having a group of indicia arranged in a predetermined significant pattern, at least one of said groups of indicia taking the form of a pattern of light passing areas, two switching units actuable by said indicia of the two elements respectively and each including a series of switch elements responsive separately to different ones of said indicia, and circuitry connecting said switching units together and responsive to actuation of the two units by corresponding groups of indicia, at least one of said switching units including means forming a series of light responsive areas functioning as said switch elements thereof, and means for passing light through said light passing areas of a corresponding one of said elements and onto said light responsive areas.

8. Apparatus for comparing a first element having a group of indicia arranged in a predetermined significant pattern with a second element having a group of indicia arranged in a predetermined significant pattern, at least one of said groups of indicia taking the form of a pattern of light passing areas, two switching units actuable by said indicia of the two elements respectively and each including a series of switch elements responsive separately to different ones of said indicia, and circuitry connecting said switching units together and responsive to actuation of the two units by corresponding groups of indicia, at least one of said switching units including a unitary strip of photoconductive material having a series of light responsive areas functioning as said switch elements thereof, and means for passing light through said light passing areas of one of said elements and onto said light responsive areas.

9. Apparatus as recited in claim 8, in which said circuitry includes means forming an electrical circuit having two branches in parallel through said two switching units respectively, with the individual switch elements of each branch in series with one another, and a plurality of conductors forming a series of connections between said two switching units at locations intermediate corresponding individual switch elements thereof.

10. Apparatus as recited in claim 8, in which said circuitry includes means forming a plurality of parallel electrical circuits each containing two corresponding switch elements of said two switching units in series.

11. Apparatus for comparing a first element having a series of indicia locations at each of which there may be indicia in either of two possible conditions, with a second element having a series of indicia locations corresponding respectively to said locations of the first element and at each of which there may be indicia in either of two possible conditions; said apparatus including first means adapted to respond when, at each pair of corresponding indicia locations on the two elements either the indicia on said first element is in a predetermined one of its conditions, or the corresponding indicia on said second element is in a predetermined one of its conditions; second means adapted to respond when there is no pair of corresponding indicia locations at which the indicia on said first element is in said predetermined one of its conditions and the indicia on said second element is also in said predetermined one of its conditions, and means responsive to both said first and second means to indicate when the conditions to which they respond both occur.

12. Apparatus as recited in claim 11, in which said last recited means are responsive simultaneously to both of said first and second means to indicate when the conditions to which they both respond occur simultaneously.

13. Apparatus for comparing a first element having a series of indicia locations at each of which there may be indicia in either of two possible conditions, with a second element having a series of indicia locations corresponding respectively to said locations of the first element and at each of which there may be indicia in either of two possible conditions; said apparatus including a first multiple switch assembly adapted to respond when, at each pair of corresponding indicia locations on the two elements either the indicia on said first element is in a predetermined one of its conditions, or the corresponding indicia on said second element is in a predetermined one of its conditions; a second multiple switch assembly adapted to respond when there is no pair of corresponding indicia locations at which the indicia on said first element is in said predetermined one of its conditions and the indicia on said second element is also in said predetermined one of its conditions, and means responsive to both said first and second switch assemblies to indicate when the conditions to which they respond both occur.

14. Apparatus as recited in claim 13, in which each of said indicia acts to pass light in one of its conditions and not to pass light in the other condition, said multiple switch assemblies being structures having light responsive areas individually responsive to light from said different indicia locations.

References Cited by the Examiner

UNITED STATES PATENTS

| | | | |
|---|---|---|---|
| 2,762,566 | 9/1956 | Stern | 235—61.7 |
| 3,027,070 | 3/1962 | Sallach et al. | 235—61.7 |
| 3,046,540 | 7/1962 | Litz et al. | 340—347 |
| 3,055,582 | 9/1962 | Battison et al. | 235—61.11 |
| 3,109,923 | 11/1963 | Welsh | 235—61.11 |

FOREIGN PATENTS

| | | |
|---|---|---|
| 743,947 | 1/1956 | Great Britain. |

MALCOLM A. MORRISON, *Primary Examiner.*

DARYL W. COOK, *Examiner.*

G. D. SHAW, *Assistant Examiner.*